United States Patent
Gross

(10) Patent No.: US 7,497,531 B2
(45) Date of Patent: Mar. 3, 2009

(54) MODULAR COUNTER ASSEMBLY

(76) Inventor: James Lee Gross, 108 E. Avenida Junipero, San Clemente, CA (US) 92672

( * ) Notice: Subject to any disclaimer, the term of this patent is extended or adjusted under 35 U.S.C. 154(b) by 712 days.

(21) Appl. No.: 11/027,995

(22) Filed: Dec. 31, 2004

(65) Prior Publication Data

US 2006/0144935 A1    Jul. 6, 2006

(51) Int. Cl.
  *A47B 87/00*    (2006.01)
(52) U.S. Cl. .................. 312/107; 312/257.1; 312/140.1; 126/8; 126/25 R; 126/9 R; 126/37 R; 403/205; 403/295; 403/403; 403/397
(58) Field of Classification Search .................. 403/205, 403/295, 403, 397; 126/8, 25 R, 9 R, 37 R; 312/257.1, 107, 140.1
See application file for complete search history.

(56) References Cited

U.S. PATENT DOCUMENTS

| | | | |
|---|---|---|---|
| 4,045,933 A | 9/1977 | Grillo | |
| 4,477,128 A * | 10/1984 | Hasbrouck | .................. 312/111 |
| 4,545,158 A | 10/1985 | Rizk | |
| 5,479,749 A | 1/1996 | Colasanto et al. | |
| 5,553,551 A | 9/1996 | Crombie | |
| 5,743,063 A | 4/1998 | Boozer | |
| 5,934,183 A | 8/1999 | Schlosser et al. | |
| 5,981,914 A | 11/1999 | Schultheis | |
| 6,039,039 A | 3/2000 | Pina, Jr. | |
| 6,276,111 B1 * | 8/2001 | Pittman et al. | ............. 52/741.1 |
| 6,378,963 B1 | 4/2002 | Relyea et al. | |
| 6,742,974 B2 | 6/2004 | Haire | |
| 2002/0020405 A1 | 2/2002 | Coleman et al. | |
| 2004/0065313 A1 * | 4/2004 | Thompson | ................. 126/37 R |

* cited by examiner

*Primary Examiner*—Jeanette E Chapman
*Assistant Examiner*—Daniel Kenny
(74) *Attorney, Agent, or Firm*—Norton R. Townsley; Belasco Jacobs & Townsley, LLP

(57) ABSTRACT

The present invention is a modular construction method for enclosures and counter assemblies. The counter assembly has a series of modules, which can be added or removed at will. The counter assembly comprises an innovative metal framework having modules connected by angled splices to enhance customization into variable shapes and sizes. Cross-supporting framework and perimeter rails may be added to incorporate customized components for drawers, shelving, appliances, storage, access doors, vents, and the like. The framework is capable of supporting countertops formed in a shape corresponding to the shape of the modular assembly. Side panels may be supported on the framework for purposes of enclosing the assembly, said panels being attached by a plurality of metal clips designed to fit into the metal framework with extensions designed to secure the side panels. The framework and components of the counter assembly are moveable, rearrangeable, and replaceable.

26 Claims, 17 Drawing Sheets

MODULAR COUNTER ASSEMBLY

BACKGROUND OF THE INVENTION

This invention relates generally to the field of indoor/outdoor counter assemblies for appliances and support of general items. Without limitation, examples of usage for said counter assemblies include hotel lobby reservation, valet, and information desks, bank counters, school reception counters, retail store counters and displays, and ticket sales counters.

One particular embodiment of the invention, shown herein, is for use of the modular counter for outdoor grills and barbecue units. More specifically, the use illustrated herein is directed toward a counter assembly for containing a barbeque unit, said assembly being comprised of modules that can be easily added or removed to enhance or streamline the entire grilling and cleanup operation.

Over the years, counter assemblies have been popular fixtures in business and personal environments, which assemblies are constructed on site from prefabricated modular components or from raw materials. The difficulty with such assemblies, however, is that they cannot be made to the shape or size desired by the consumer without significant expense, and therefore consumers are required to select from one of several pre-designed assemblies or pay significant amounts to have a custom design. In addition, the transport and construction of counter assemblies are typically problematic, requiring significant cost, labor, and time in getting the materials to a construction site and then building the assembly on the site, which requires a large access and construction area. Customization of counter assemblies for usage in particular applications has also required significant outlays of cost, labor, and time because such assemblies have not allowed for modular parts that can be adapted to various applications. Finally, counter assemblies have traditionally not been constructed for movability and so, when it becomes necessary to change location, the assembly must be torn down and an entirely new counter assembly built in its place.

In this patent application, the invention is demonstrated, as one embodiment, being utilized with a customized barbeque that has been specifically designed to enhance and increase air flow and air supply for ignition and grill cooking purposes. This modular assembly can be adapted to allow for sufficient air induction throughout the assembly. Also, the structure can be built in any of a variety of shapes to accommodate space and design requirements, and it can be built to allow for the addition of various features useful to the barbeque function, such as ignition controls, drawers, shelves, fresh and gray water tanks. The flexibility of the counter assembly is a significant innovation.

In similar fashion, the modular countertop assembly can be modified with minimal effort and expense to customize it for other uses. Panels attached to the modular structure can be made of any material desired by the consumer, like wood for a hotel lobby or slate for an outdoor ticket counter. The panels can fit tight at the corners or be separated for air circulation or induction. The counter assembly can be modified to fit various spaces and shapes because the framework pieces are available in various sizes and can be connected in a variety of configurations, even resulting in round or curved shapes. It is also possible to have more than one set of panels so the panels can be changed to suit the preferred decor for any particular situation because of the ease with which they can be removed and replaced.

In the counter assembly industry, structures are commonly built from raw materials, like bricks, cinder blocks, or stones mortared in place, plywood and wooden studs, and stucco and wooden studs. Such counter assemblies are permanent structures, immovable, expensive to customize, labor-intensive to build and tear down, and difficult to maintain in a clean and usable condition. The present invention involves an innovative counter assembly comprised of a metal skeleton framework with a novel clip attachment system. Side panels and top counters are also part of the assembly. The clip system allows fast and easy setup and tear down, and the addition, elimination, and replacement of units as desired. This modular counter assembly offers a new way to construct the popular islands stands commonly used for outdoor barbeques, as well as counters for indoor and outdoor usage like mall kiosks, ticket counters, lobby information counters, reservation desks, and so forth.

DESCRIPTION OF THE RELATED ART

In some instances, prior art has recognized the potential effectiveness of a modular framework assembly for interior structures. Among these, we find U.S. Pat. No. 5,647,650, which issued on Jul. 15, 1997 to inventors Daugherty et al. This discloses a modular storage and support assembly for drawers and shelving, based on a unique support architecture.

U.S. Pat. No. 6,378,963 B1 issued on Apr. 30, 2002, to inventors Relyea et al. This patent describes a modular drawer system with a system of interchangeable parts.

U.S. Pat. No. 5,553,551 issued on Sep. 10, 1996 to inventor T. Crombie. This discloses an interlocking modular bench.

U.S. Pat. No. 5,479,749 issued on Jan. 2, 1996 to inventors T. Colasanto et al. This discloses structural building systems based on lightweight steel framing.

U.S. Pat. No. 4,545,158 issued on Oct. 8, 1985 to inventor J. Rizk. This discloses an interior wall structure for a transportable building module.

A number of inventions of prior modular systems have specific application of such modular assemblies to barbeque systems, although the general focus of the inventions is on the barbeque mechanisms rather than the structure that holds the appliance itself.

For example, U.S. Pat. No. 6,039,039 to A. Pina, jr. discloses a modular outdoor grill which utilizes a food supporting tray and an external firebox.

U.S. Pat. No. 5,981,914 to B. Schultheis discloses a modular grilling and cooking apparatus that utilizes an electric glass or ceramic smooth cooking surface, suitable for temporary or permanent use in an outdoor grill or indoor setting. The same inventor developed an improved modular kitchen range, reported in U.S. Pat. No. 6,230,701 B1, which issued on May 15, 2001.

U.S. Pat. No. 5,934,183 to Schlosser et al discloses a portable gas barbeque unit which claims modular components, including lid, extendable shelves, firebox, and storage bins.

None of the above cited prior art, nor any art discovered, discloses an indoor/outdoor modular counter assembly system with countertop construction. Nor does the prior art describe modular structures sufficient to support countertops with the added innovation of being constructable in varieties of angles, shapes, and sizes, moveable, exchangeable, and easily and inexpensively adaptable to various custom uses. None of the prior art describes modular framework similar or identical to the present invention, nor does it solve the problem of facilitating custom usage of the modular system, like for cooking on a barbeque set into the countertop, and allowing for easy maintenance of the structure, including efficient and low cost cleaning and replacement for wear and tear or other damage. The true modularity of the present invention is indeed a novel feature.

Other objects and advantages of the present invention will become apparent from the following descriptions, taken in connection with the accompanying drawings, wherein, by way of illustration and example, an embodiment of the present invention is disclosed.

SUMMARY OF THE INVENTION

This present invention is for an indoor/outdoor modular counter assembly that is adaptable for the support and usage of appliances and general items like barbeque grills, cash registers, popcorn machines, computers, and so forth. The structure is made of horizontal metal rails and vertical metal risers that can be connected to form various shapes and sizes of counters, and thus are customizable to the requirements of the consumer. The metal structures are held together by splices that insert into the horizontal rails, which splices are available in all degrees to allow the counters to be variably shaped. Support rails can be added through the interior of the structure to provide for drawers, shelving, and other optional components. Once the structure is built, outer panels are added using clips that have been specially designed for this purpose.

A major advantage of the present invention is that it can be moved, removed, built, and reshaped easily, with minimal cost and labor. A further advantage is that it can be adapted to allow for air circulation and induction for appliances that require such for efficient operation, like barbeques and computer systems.

Although the structure is truly modular, the unique design by which the rails are attached together render the structure rigid and capable of supporting heavy countertops and side panels, even if made of stone. The countertops used may be of any durable material, whether light or heavy in weight, and they may be cut in any shape matching the structure and desired by the customer. Examples of material include granite, wood, tile, ceramic, and synthetic materials. Similarly, the side panels may be of any durable material, whether light or heavy in weight, like granite, wood, tile, ceramic, hard molded plastic, and synthetic materials. The panel connecting clips and stabilizing clips are specially sized to accommodate panels of various thicknesses.

The primary object of the invention is to deliver a modular indoor/outdoor counter assembly that combines the advantages of a fixed support system capable of holding appliances that require a dependable and sturdy platform with the advantages of labor and cost efficient construction, movability, maintenance, and replacability.

Another object of the invention is to provide a counter assembly that can be customized for the requirements of the consumer with regard to the shape and size of the assembly, the components of the assembly, and the use and cleaning of appliances used with the assembly.

Another object of the invention is to provide a counter assembly through which air can be inducted and diverted for use with the appliances supported by the assembly, like for efficient burning in a barbeque or for cooling computer devices.

Yet another object of the invention is to provide a counter assembly that is self-contained such that if electrical, gas, plumbing, and other exterior supply lines are unavailable at the location where the counter assembly is to be utilized, components can be inexpensively and efficiently added to the modular assembly to accommodate these requirements. Such components that can be supported within the assembly may include fresh and gray water tanks, battery-powered plugs and ignition controls, fuel supply tanks, and so forth.

Another object of the invention is to attain modularity through a novel system of metal framework, splice attachment, and clip connection to allow additional counter capacity to be added or removed and to permit inexpensive exchange or replacement of all or parts of the assembly.

Another object of the invention is to provide a counter assembly that is inexpensive, customizable, easy to manufacture and assemble, and movable, while at the same time being sturdy and reliable for support of heavy and heated appliances, like barbeques.

Other objects and advantages of the present invention will become apparent from the following descriptions, taken in connection with the accompanying drawings, wherein, by way of illustration and example, an embodiment of the present invention is disclosed.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

FIG. 14A shows the clip from a side view. FIG. 14B is a perspective view of the clip being utilized to hold a side panel, the framework being removed. FIGS. 14C and 14D show perspective front and back views, respectively, of the clip being utilized to hold a side panel to the top of the framework.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as representative basis for teaching one skilled in the art to employ the present invention in virtually any appropriately detailed system, structure or manner.

Figure 1:
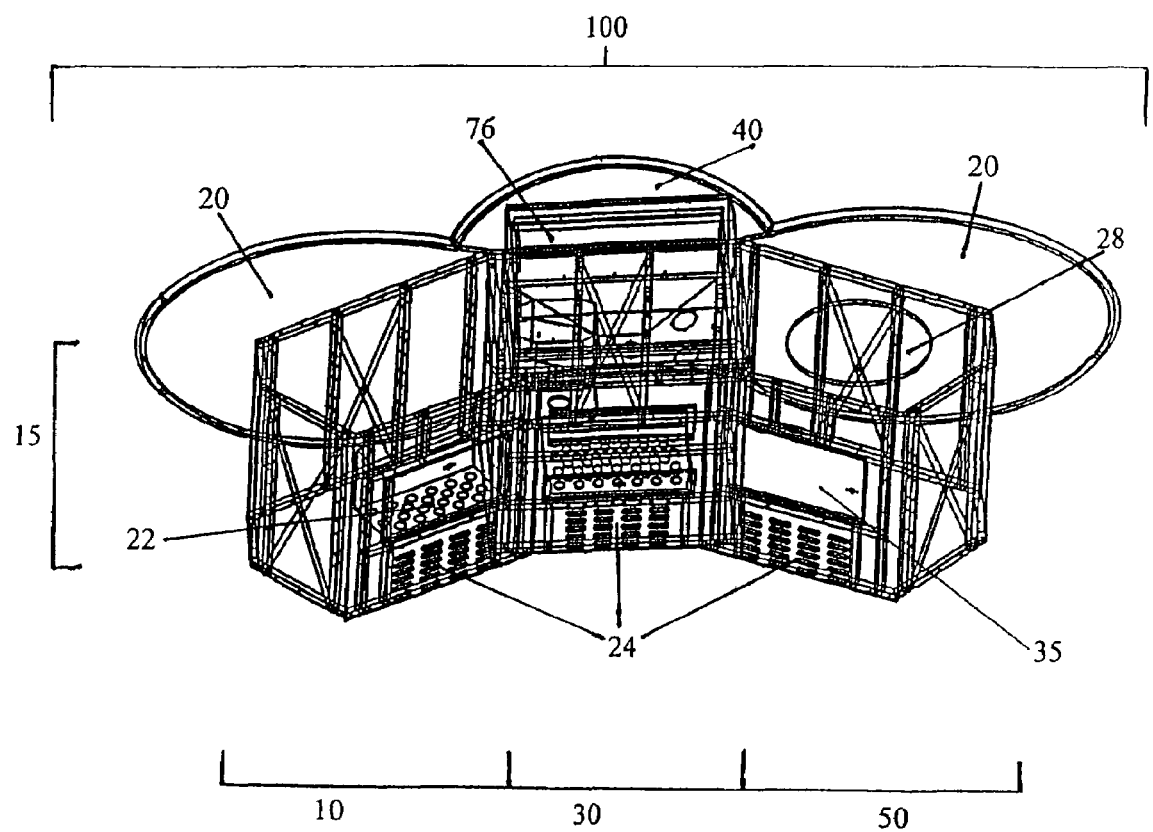
FIG. 1 is a perspective frontal view of the present invention, showing, as one embodiment, installed within the modules a grill system with some components omitted for clarity. Three modules are displayed.

Referring now to FIG. 1, we see a perspective view of a preferred embodiment 100 of the present invention from a frontal view. This is a very simplified view of an outdoor grill and counter assembly. The side panels are removed, as are most of the internal grill components, leaving only the metal framework 15, the countertops 20, 40, and the grill components on display.

In this particular embodiment, we see three modules: the left side module 10, the central module 30, and the right side module 50. Circular countertops are shown: end tops 20 and central top 40. Of course, the countertops need not be curved, and can be virtually any shape appropriate to the service.

The modules are shown here in a configuration typical for exterior barbeques with the left and right sides angled toward the center module. This configuration can be altered to a shape preferred by a customer simply by attaching the separate pieces of the metal framework at planar or various angled positions using splices of the required angles (see FIG. 16). The modular assembly may consist of one or more modules.

In the center module 30 of this figure, the grill lid 76 is seen on top of the counter 40. Other components of the grill are also present, and will be further identified in later figures.

At the top of right hand module 50 is a cutout 28 for the sink. Lower down on the right side is seen access door 35. This is used to access the internal grill components, shown in later figures. At the same level in the left side module is seen a charcoal holding drawer 22. This unique drawer has holes in the bottom allowing for air circulation. Charcoal can be stored here safely even during operation of the grill.

Finally, at the bottom of each module are displayed air vents 24. These work in concert with fans and blowers to promote air circulation to the grill fuel.

This figure serves to illustrate the variety of components that can be supported by and utilized with the present invention. Such components might include, without limit, heavy or light appliances, heat-emitting appliances, sinks and plumbing fixtures, drawers, vents, cabinets, racks, shelving, and doors.

Figure 2:
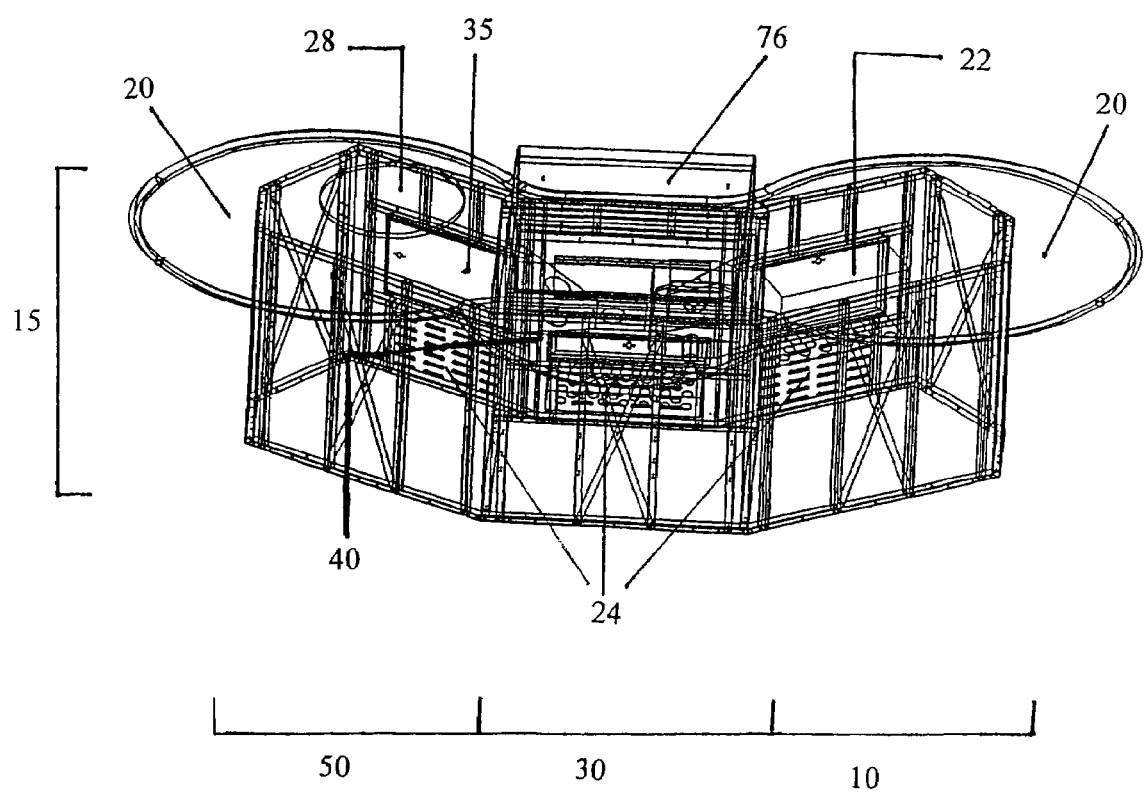
FIG. 2 is a perspective rear view of the present invention, showing, as one embodiment installed within the modules, the grill system with some components omitted for clarity. Three modules are displayed.

FIG. 2 shows the invention from a rear perspective. For purposes of illustration, this figure shows a cooking grill installed in the modular counter assembly, said assembly having three modules 10, 30, 50 created by metal framework 15 that is held together and stabilized by splices (shown in FIG. 16) to form a structure. Side panels can be attached to this metal structure by means of panel connection and stabilizing clips (shown in FIGS. 11 through 14), but the panels have been eliminated for purposes of showing the structure in this figure. Said structure can support heavy or lightweight appliances, a countertop of any shape (here it is shown as circular shapes 20, 40), and any components desired or required by a consumer. In this figure, the components installed in relation to the cooking grill include a cut out for a sink 28, an access door 35, a charcoal storage drawer 22, and air vents 24.

Figure 3:
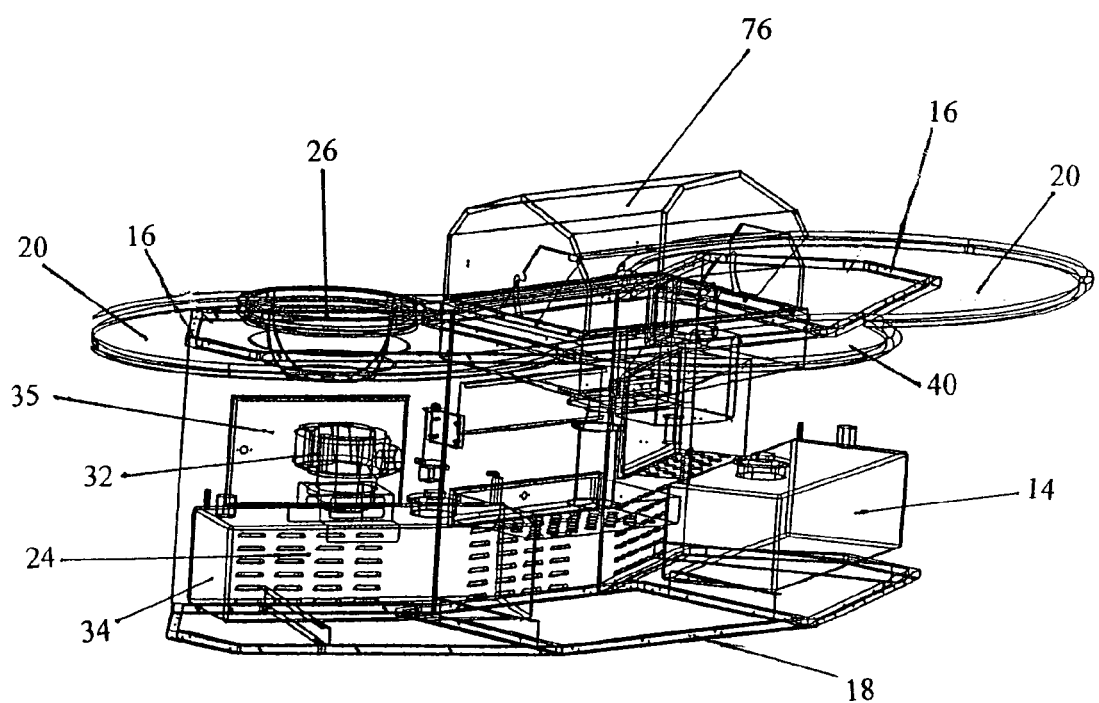
FIG. 3 is a cutaway view from the rear of three modules of the present invention displaying, as one embodiment, a cooking grill and related components.

FIG. 3 shows a cutaway view from the rear of the three modules of the present invention, having the most of the metal framework removed. This figure illustrates the diverse components that can be supported and utilized with the counter assembly, even rendering it a self-contained unit if needed in the absence of supply lines for utilities. Any of these components are optional and the counter assembly can be built with additional cross-supporting framework for said optional components. To illustrate, this figure demonstrates a cooking grill and related components. Many of the internal components are omitted from this view, but the sink 26, air blower 32, water tanks 14, 34, access door 35, front air vents 24, countertops 20, 40, and grill lid 76 are shown. The top perimeter framework 16 and lower perimeter framework 18 of the modular counter assembly are also present.

Figure 4:
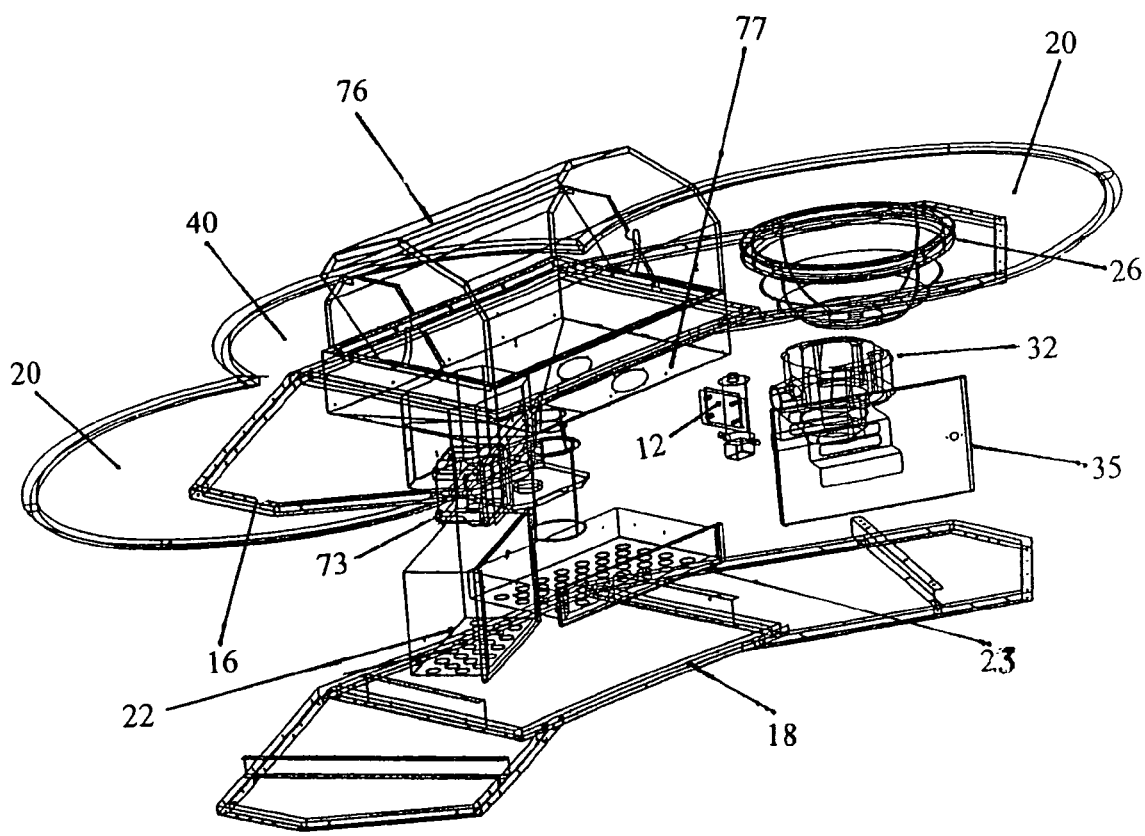
FIG. 4 is an exploded perspective cutaway view with vertical framework omitted, displaying as one embodiment, a cooking grill and related components.

FIG. 4 shows an exploded perspective cutaway view from the front of the three modules of the present invention displaying, as one embodiment, a cooking grill and related components. In this view, the vertical risers of the modular framework have been removed for a better view of the internal components. The top perimeter framework 16 and lower perimeter framework 18 of the modular counter assembly are present, and also the countertops 20, 40. The internal components that can be seen in this view are the sink 26, air blower 32, access door 35, charcoal storage drawer 22, cooking grate storage drawer 23, control box 73, grill lid 76, and grill base 77 are shown. The drawers, trays, and other internal components can be supported using cross-support framework and drawer support brackets that are secured to the vertical risers of the modular framework, but these supports have been eliminated for better viewing in this figure (see FIGS. 6, 8, and 9)

Figure 5:
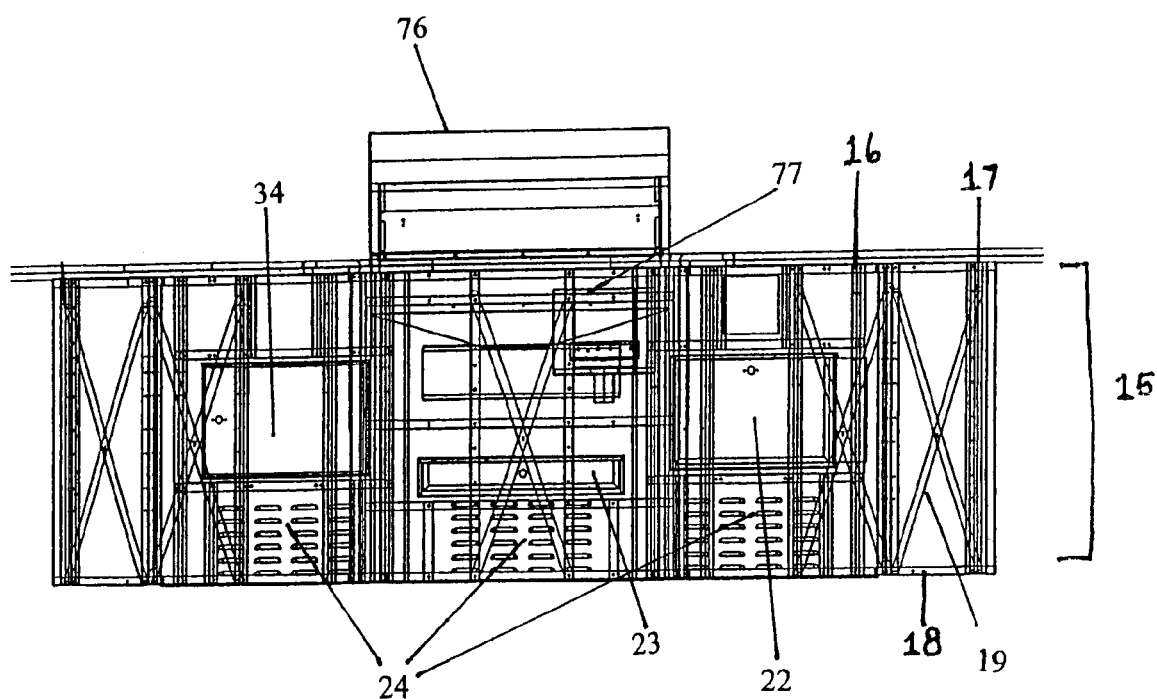
FIG. 5 is a cutaway view of the present invention shown from the rear of the counter assembly, displaying as one embodiment a cooking grill and related components.

FIG. 5. illustrates the present invention from a cutaway view directly from the rear of the counter assembly. The cooking grill and a few related components are illustrated in this figure, namely an access door 34, charcoal storage drawer 22, clean-out drawer 23, grill base 77, and air vents 24.

The modular framework structure 15 for the counter assembly is illustrated without side panels. It can be seen that the structure consists of lower perimeter rails 18 attached to vertical risers 17, which in turn are attached to upper perimeter rails 16. Cross vertical supports 19 may be added for additional stability. This framework is described in subsequent figures.

Figure 6:
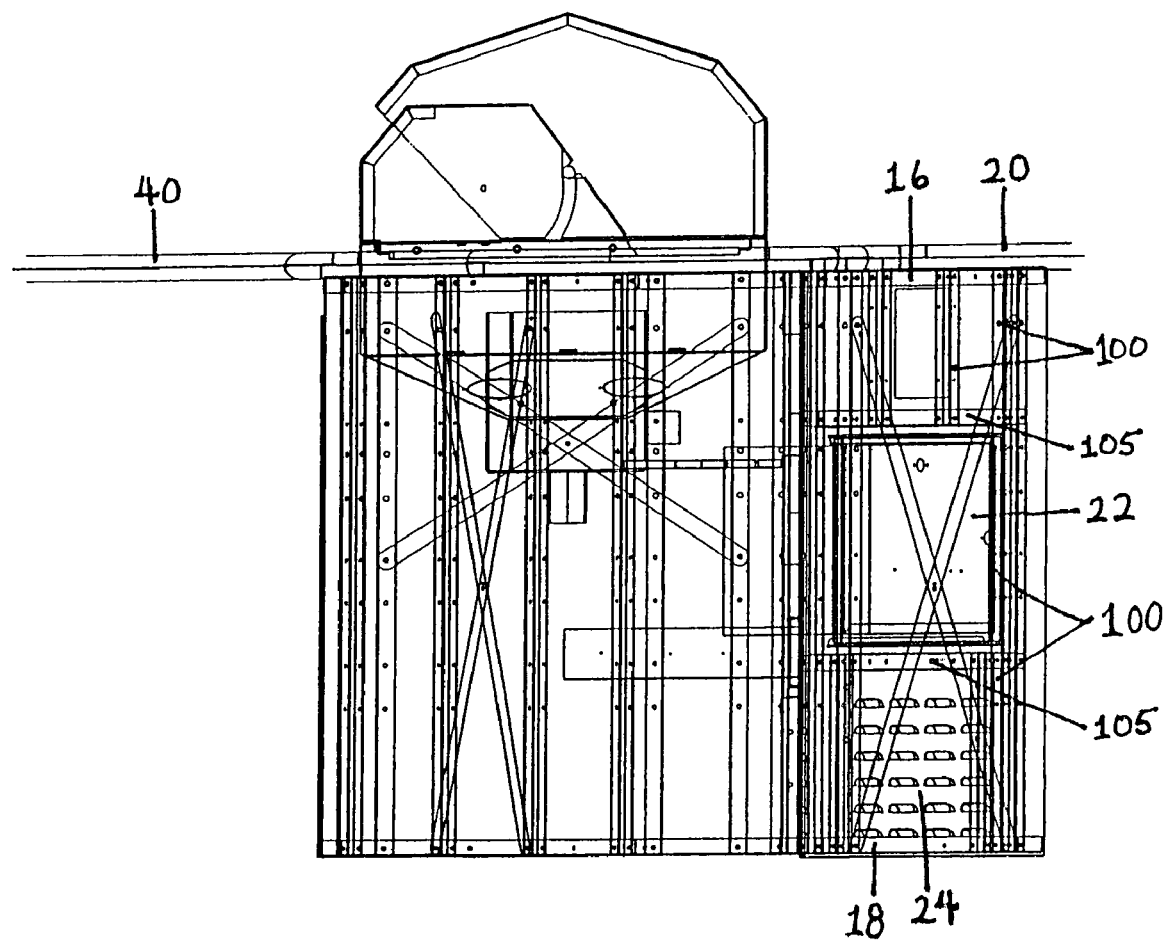
FIG. 6 is a cutaway view of the present invention shown from the side of the counter assembly, displaying as one embodiment a cooking grill and related components.

FIG. 6. illustrates the present invention from a cutaway side view of the counter assembly. This figure shows how a component can be integrated and supported within the modular framework by shortened vertical risers 100 and shortened perimeter rails 105 that form a support frame for the component. By way of example, this figure shows an air vent 24 and a charcoal or utility drawer 22 inserted into one of the counter assembly modules. The upper and lower perimeter rails 16, 18 and the countertop 20, 40, are also visible, as well as other components of the barbeque, shown only for illustration purposes here.

Figure 7:
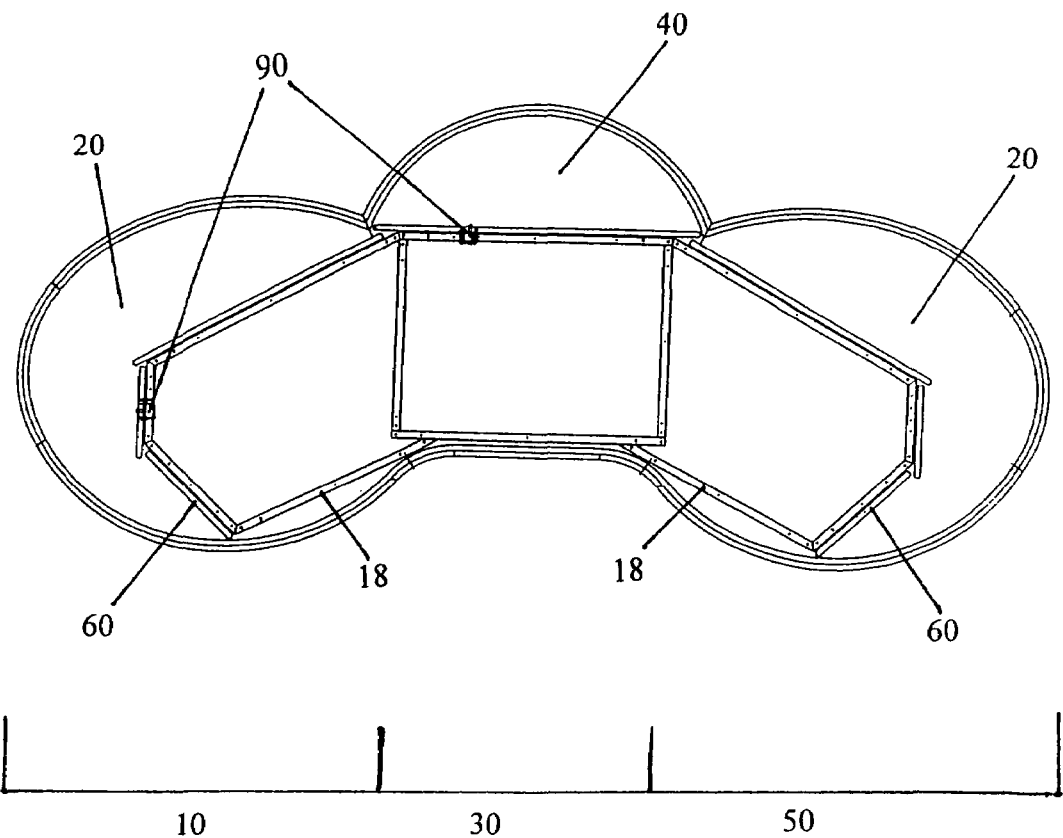
FIG. 7 shows the invention displayed from the bottom showing the modular structure and countertops alone, without any components that might be used within the modules.

FIG. 7 shows the invention displayed from the bottom, showing the modular structure and countertops alone, without any appliances or other components that might be used within the modules. Three modules are shown 10, 30, 50, with portions of the circular end countertops 20 and center countertop 40 extending into view. The shape and material of the countertop is variable, depending on consumer preference.

The lower perimeter framework of the modular structure is the same as the top framework of the modular structure. It can be seen that the lower perimeter consists of modular pieces of varying sizes 18, which can be assembled in a variety of configurations, allowing a counter assembly to take the shape desired by the consumer. These modular framework pieces are attached using splices of varying angles at the corners (see FIG. 16).

Attached to the exterior of the modular structure pieces are panels 60, the bottom of which are visible from this view. These panels can be made in varying widths allowing small gaps at the corners for additional air circulation or closing the gap at the corners. The side panels may be made of any material in any color without limit. Examples include stone, wood, hard plastic, stretched leather or canvas, and any hard synthetic.

Also visible in this drawing are the panel connection clips 90 that secure the panels 60 to the lower perimeter rails 18. One or more panel connection clips 90 are used to secure each panel 60 to the lower perimeter rails 18. Only two clips are shown in this figure for purposes of illustration, but when assembly is completed, each side panel is secured at the bottom to the framework using at least one panel connection clip. Said clips are further described in subsequent figures.

Figure 8:
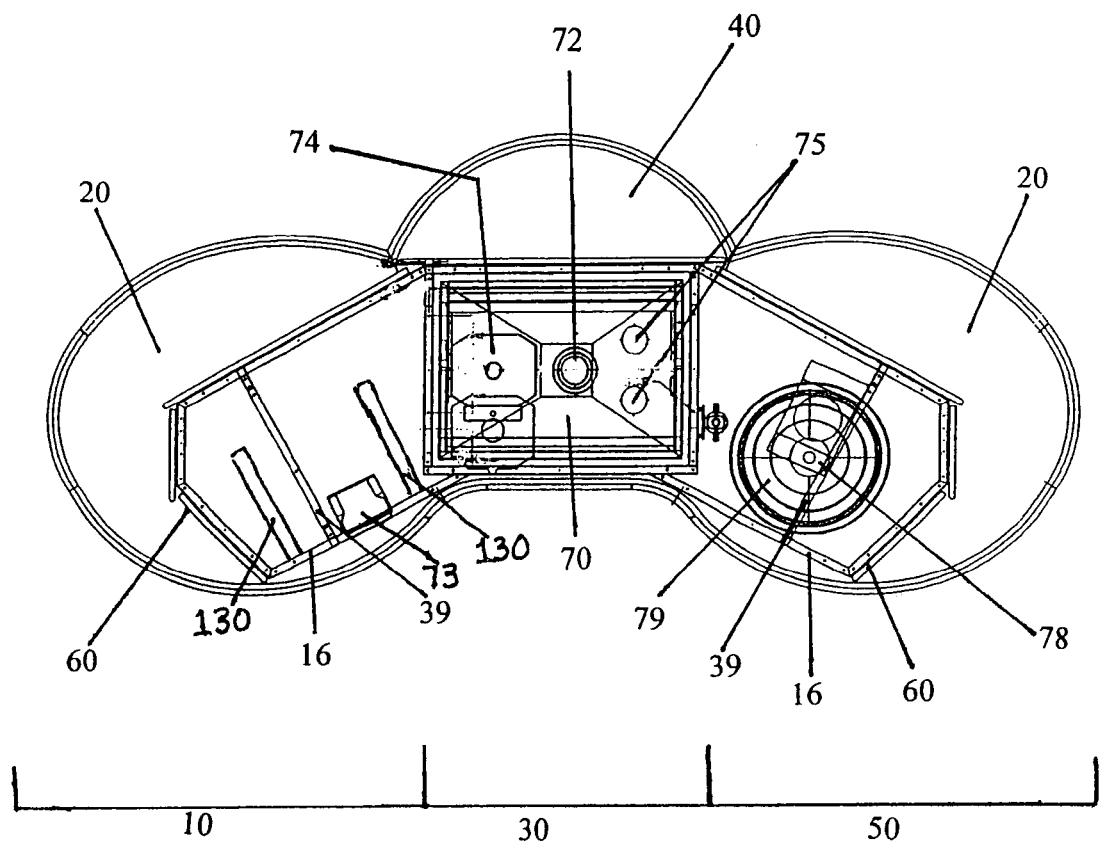
FIG. 8 is a cutaway view of the invention from the top, showing the upper framework perimeter, the countertops, and as one embodiment, the grill system installed within the modules of the counter assembly.

FIG. 8 displays a cutaway view of the invention from the top. Circular end countertops 20 and central top 40 are shown as transparent, to illustrate the underlying structure. Beneath the countertops can be seen the top perimeter 16 of the upper perimeter rails of the framework of the modular structure. It can be seen that this upper perimeter consists of modular pieces of varying sizes. These pieces can be assembled in a variety of configurations, allowing a counter assembly to take the shape desired by the consumer. The rail pieces are attached by means of splices, as described in later figures. For additional components, like drawers, doors, tanks, shelving, racks, and so forth, that might be added to the modules, additional horizontal cross-supports 39 and drawer support brackets 130 (see FIG. 9) can be attached to the perimeter rails or vertical risers. Horizontal cross-supports 39 can also be attached to the perimeter rails 16 for additional stability as desired.

Attached to the exterior of the modular structure pieces are panels 60, the top of which are visible from this view. These panels can be made in varying widths allowing small gaps at the corners for additional air circulation or closing the gap at the corners.

In this figure, a grill and its major components have been shown as one embodiment. The components are shown in cutaway view, with the cooking grill 70 in the center module 30, lid and upper racks being removed. In the lower left portion of the grill is a firebox 74, used to ignite the charcoal or other solid fuel used for grilling. In the center of the grill bottom is a drain aperture 72 leading to a waste disposal system, not shown in this view. Additional apertures for air intake 75 are shown on the right side of the grill bottom. A sink and drain system 79 are set into the left module 50. Controls for the grill are enclosed in an electrical circuitry box 73 attached to the right module 10.

Figure 9:
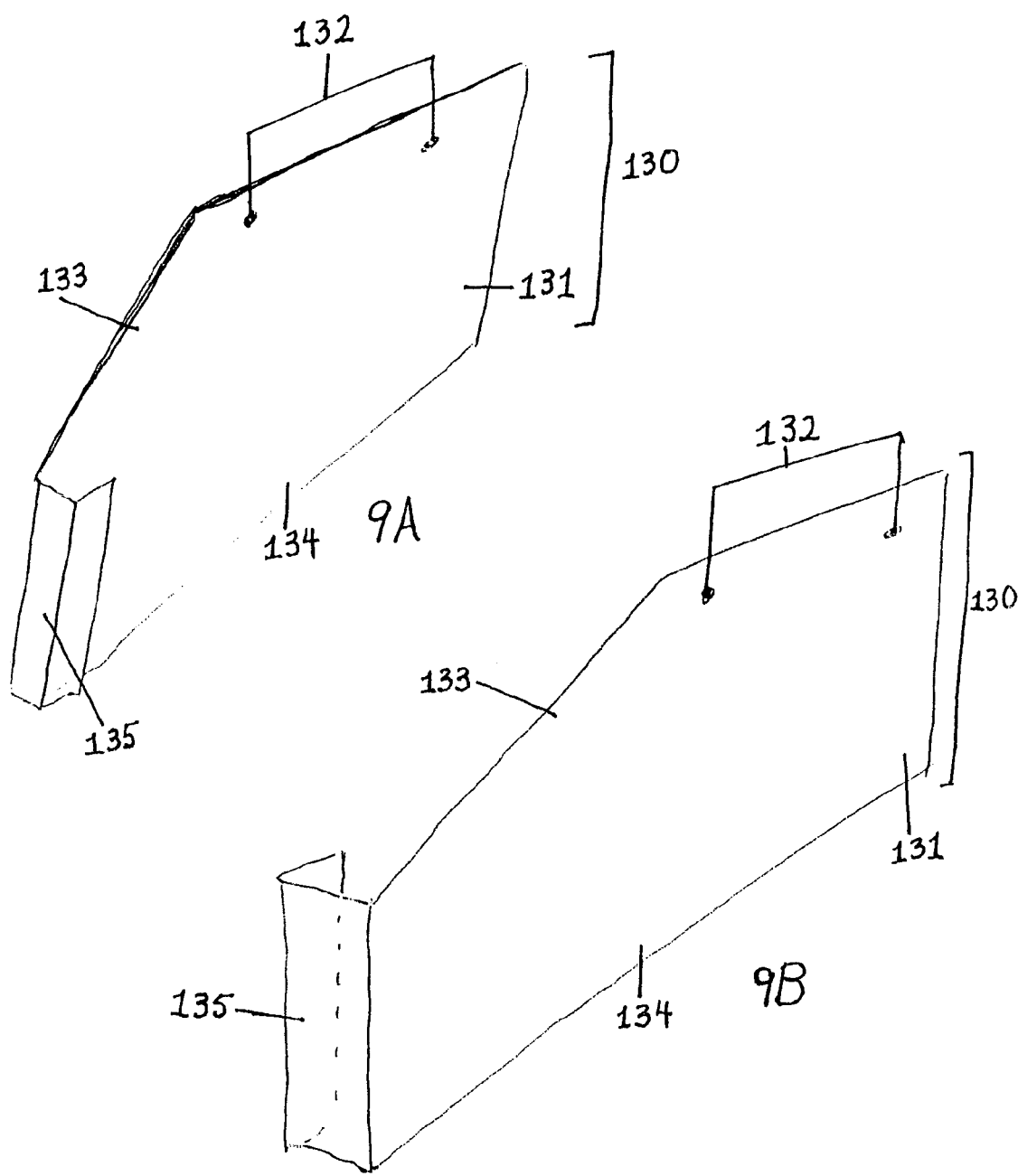
FIG. 9 consists of perspective views of the drawer support brackets, FIG. 9A being the left-side bracket shown from the side facing the drawer and FIG. 9B being the right-side bracket shown from the side facing away from the drawer.

FIG. 9 illustrates drawer support brackets that may be attached to the modular counter assembly of this invention for purposes of adding drawers of any size or type to the assembly. In FIG. 9A, a left-side bracket is illustrated in perspective from the side facing the drawer. The bracket is planar and shaped as an approximately rectangular shape at one end 131, having two holes 132 near the upper end for attachment of a drawer slider. Any type of drawer rail slider may be used, but a full extension slider is preferred. At the opposing end, the upper side of the bracket has a downward obtuse angle 133, while the lower side 134 remains at the same level as the rectangle edge. Thus, the bracket narrows toward this end and then becomes a squared U-shape 135 at the edge. This squared U-shape 135 part is placed over and attached to a vertical riser to hold the drawer support bracket in the place desired within the modular counter assembly.

FIG. 9B shows a perspective view of a right-side drawer support bracket from the side facing away from the drawer. The elements of the right-side drawer support bracket are the same as described in FIG. 9A.

Figure 10:
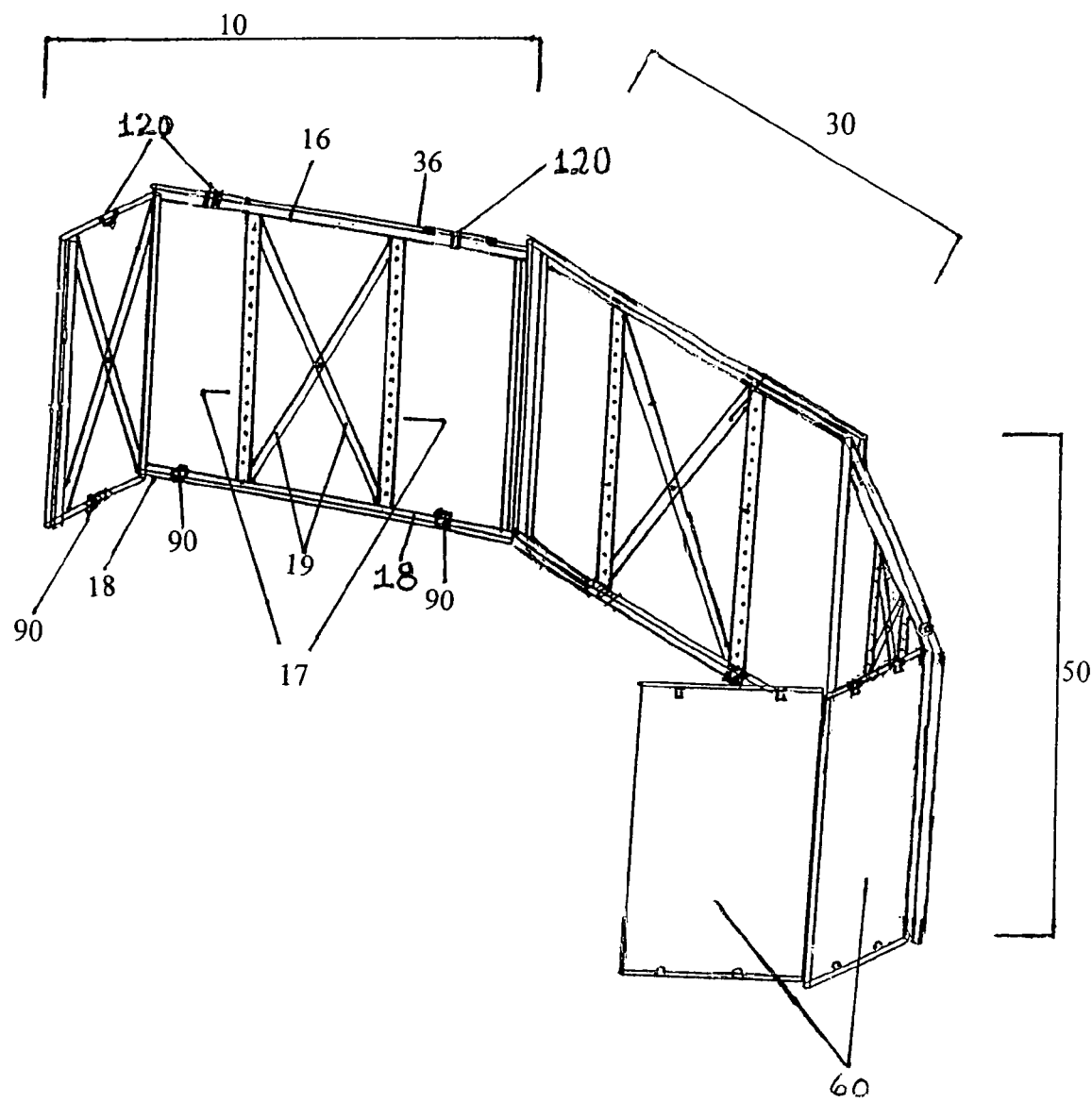
FIG. 10 is a perspective view of the modular framework in part, having side panels in place, and with countertops, front modular sections, and appliances removed.

FIG. 10 portrays a perspective view of a partial outer perimeter of the modular counter assembly framework and side panels, having countertops and variable components, like drawers, doors, shelving, and appliances, removed. In this perspective view, the components of the modular structure are visible. Each module 10, 30, 50 consists of one or more framework sections. A framework section is comprised of an upper 16 and lower 18 rail connected by means of one or more vertical risers 17, depending on the length of the section desired. For additional stability in longer sections, vertical cross-support stabilizing rails 19 may be inserted in a diagonal cross formation. The rails and risers are attached to each other by a secure means, like nuts and bolts or screws. The modules are attached together by means of splices (see FIGS. 15 and 16) inserted into and secured to the upper and lower metal framework rails 16, 18, which splices are available in angles ranging from 1 to 180 degrees at 1 degree intervals, allowing for the corners to be customized to the angles needed for building the shape most preferred by the consumer.

In FIG. 10, side panels 60 have been added to the framework by means of panel connecting clips 90 and panel stabilizing clips 120. One or more clips can be used as needed to secure the side panels to the framework. These clips are described further in subsequent figures.

Figure 11:
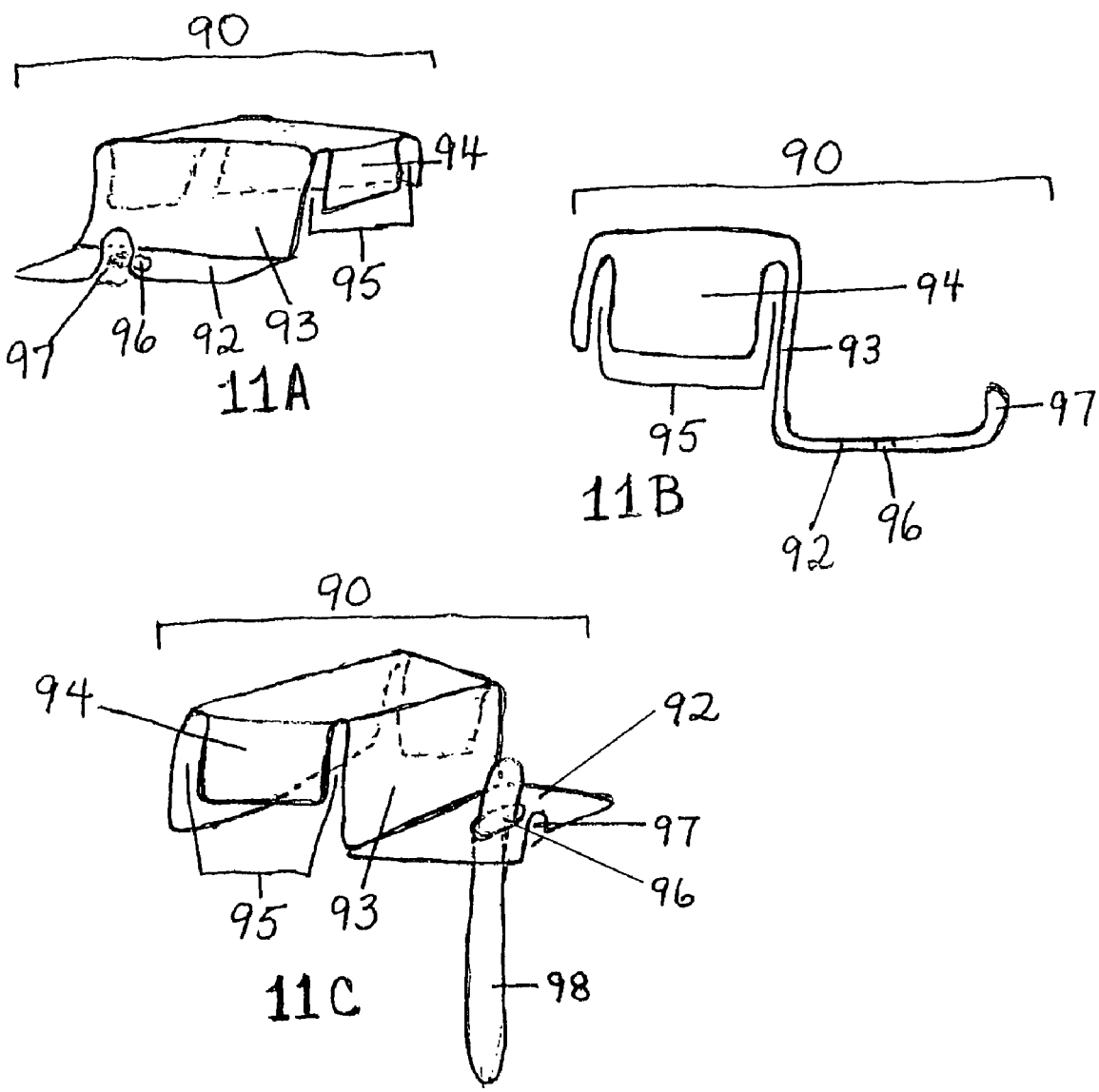
FIG. 11 illustrates three views of the panel connection clip displaying interlocking slots and hole for anchoring pin, FIG. 11A being a perspective view from the tongue of the clip, FIG. 11B being a side view of the clip, and FIG. 11C being a perspective view with an anchor pin inserted through the hole in the clip.

FIG. 11 illustrates the metal panel connecting clip from three views. In FIG. 11A, the clip 90 is shown in a front perspective view from one end, looking across the metal clip from the tongue 92, which is pierced with an aperture 96 for anchoring. The tongue 92 extends at a 90-degree angle away from one long face of a rectangular box 93, said box having one face open. The corners of the box consist of open slots 95 extending from the open face of the rectangle to the opposing closed face of said box. This box and the open slots are specifically sized to be inserted onto the lower perimeter rails of the framework. The tongue 92 of the clip terminates with a small tab 97 portion that curves upward at a 90-degree angle toward the plane of the closed face of the rectangular box, forming a "j" shape. When this clip is in use, the rectangular box portion is inserted onto a lower perimeter rail of the framework with the tongue extending outward from the exterior of the modular counter assembly. A side panel can then be inserted onto the tongue between the tab and the rectangle face. One or more of these clips can be used in this way to secure side panels to the modular framework, which side panels are further stabilized in place by use of panel stabilizing clips as described in subsequent figures.

FIG. 11B shows a panel connecting clip from a side view. In this view, we can clearly see the tongue 92 extending at a 90 degree angle from the longer face of the rectangle 93 and one side of the rectangular box 94 having slots at the corners 95. The slots 95 are made to be inserted onto the lower perimeter rails of the framework, allowing the clip to fit snugly into channels of the lower framework (as shown in FIG. 12).

FIG. 11C is a perspective view of a connection clip 90 with a bolt 98 through the aperture 96 for purposes of securing the assembly module to the ground, floor, or other platform where the assembly is being constructed. The components of the clip are as described for FIGS. 11A and 11B.

Figure 12:
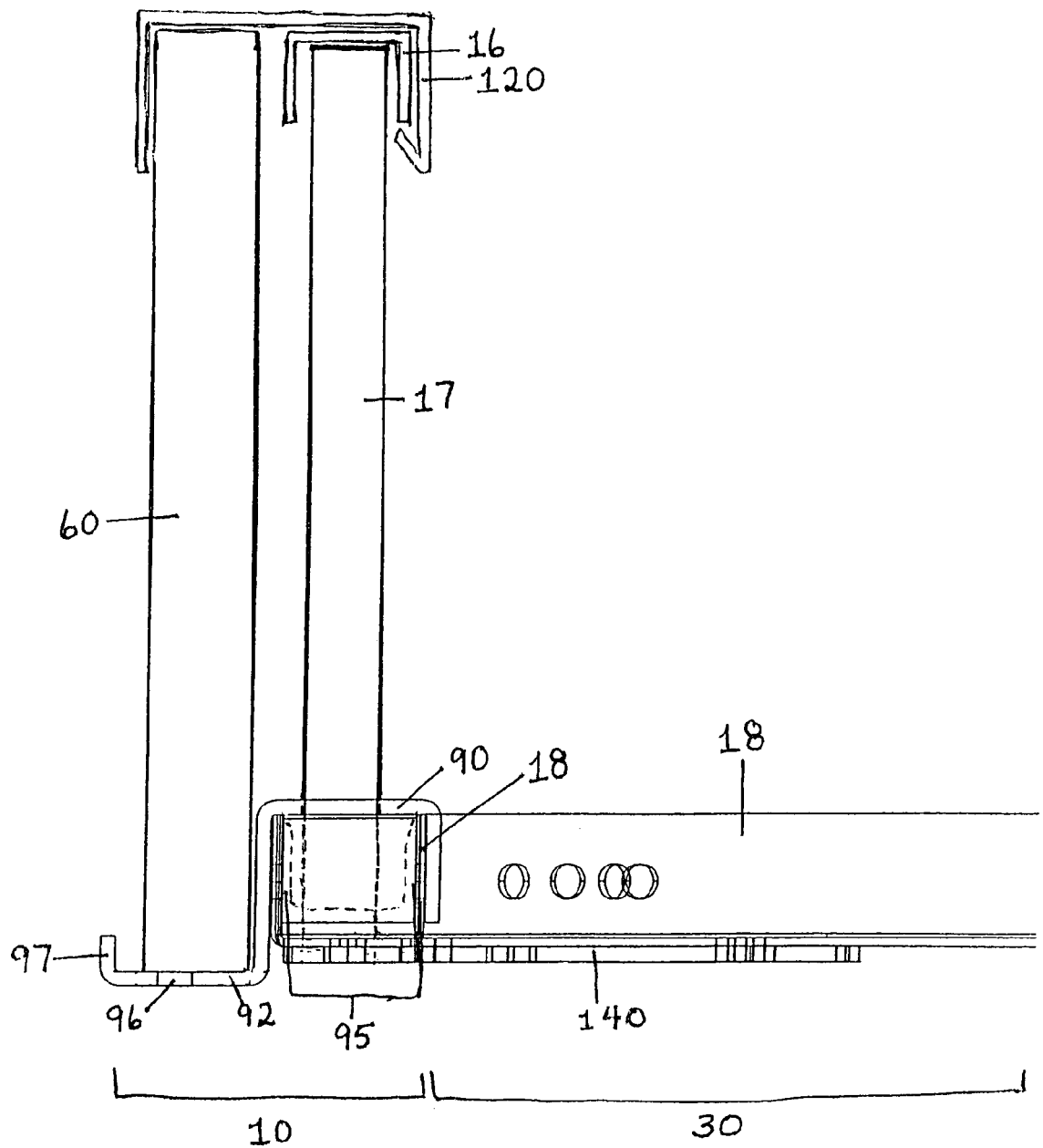
FIG. 12 is a cutaway side view of one panel connection clip and one panel stabilizing clip being utilized with the framework and a side panel.
Figure 15:
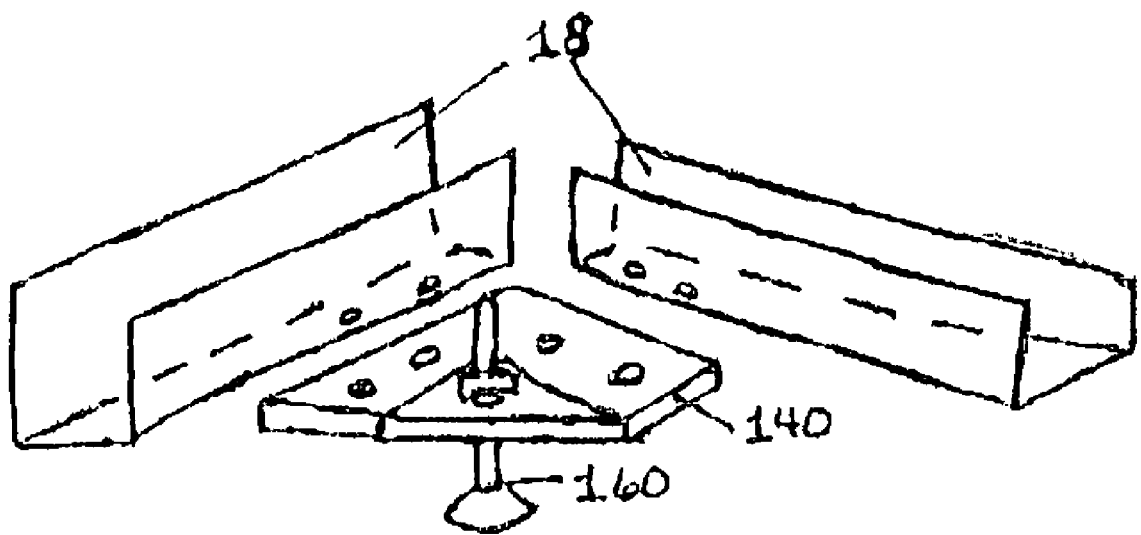
FIG. 15 is a perspective view of two lower perimeter rails being placed onto a corner splice, displaying a leveling foot.

FIG. 12 shows a cut away side view of two attached modules 10, 30. A vertical riser 17 is shown attached to a lower framework rail 18 of module 10, having only the end of the lower rail 18 of module 10 visible because it extends away from the viewer. The side of the lower rail 18 of module 30 is visible, being attached at an angle to module 10. The lower rail 18 of each module 10, 30 is connected at an angle by means of a splice 140 (further described in FIGS. 15 and 16), one half of the splice being attached beneath the end of each rail so that the rails form a corner. Said splice 140 may be of any angle ranging from 5 to 180 degrees, allowing the modules to be placed to create a counter shape that is most preferred by the consumer. If leveling of the modular counter assembly is required, a leveling foot may be placed through the splice 140 and secured as shown in FIG. 15.

In the side cutaway view, a side panel 60 is shown connected to one module 10. A second panel could also have been connected to the other module 30, but it has been eliminated for purposes of simplifying this figure. The panel 60 is on the exterior of the framework for module 10, such that when all panels are in place they form an enclosure.

The panel 60 is secured to the lower framework rail 18 of the module 10 by means of a panel connection clip 90, which is seen in cutaway view here. This connection clip 90, previously described in FIG. 11, may be placed onto the lower rail 18 at any position where it best supports the side panel 60, which may or may not be at the corner where the modules 10, 30 meet. From this view, it can be seen how the panel connecting clip 90 fits into the metal rail of the lower framework 18 by means of inserting the rail edges into the slots 95 in the clip such that the clip rests into the groove of the lower framework 18. The tongue portion 92 of the connection clip then extends outward away from the exterior of the module 10 and the side panel 60 is inserted into the reverse "j" shape formed by the tongue extension 92 and tab 97.

Figure 14:
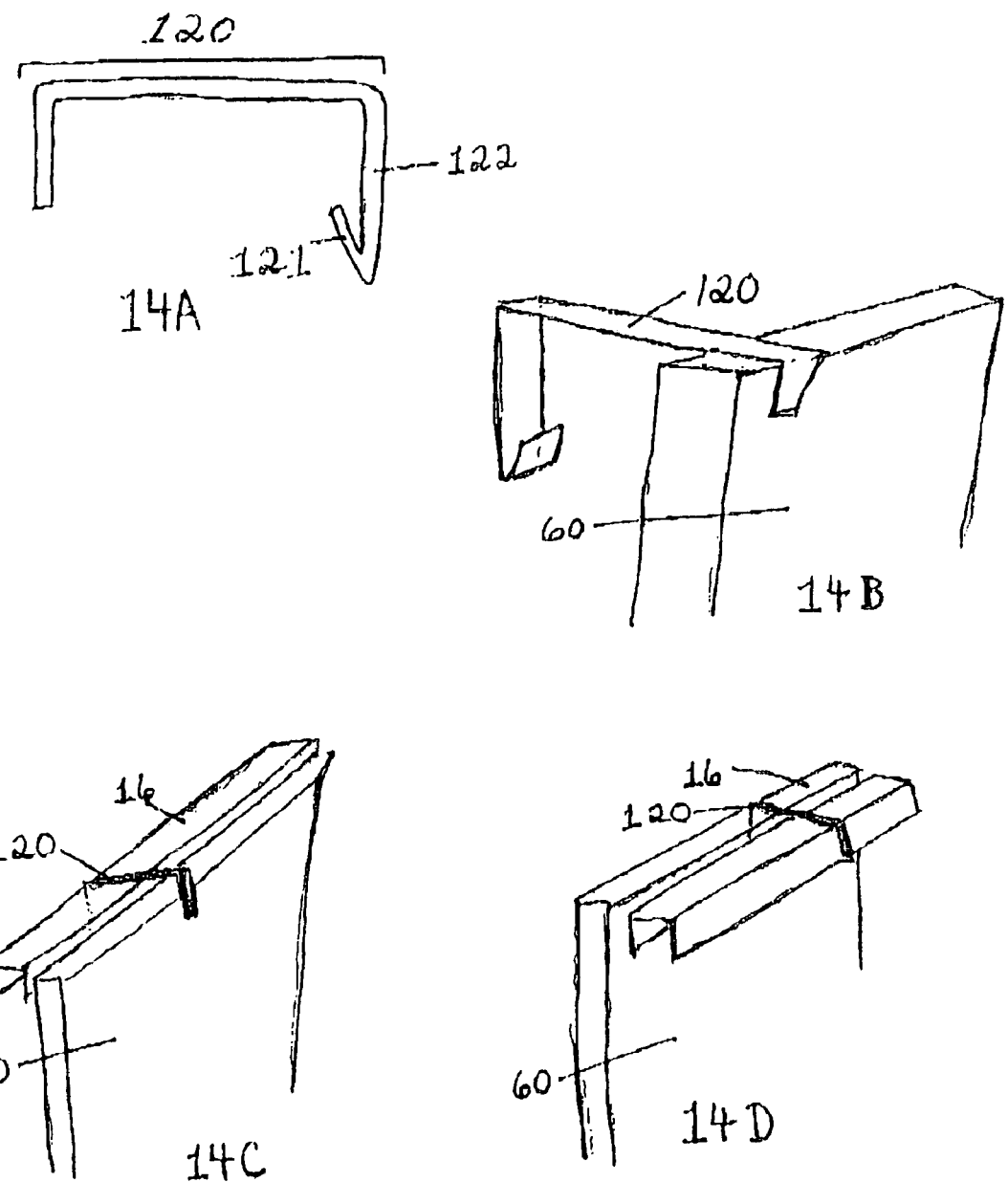
FIG. 14 are four views of the panel stabilizing clip.

At the top of the side panel 60, at least one panel stabilizing clips 120 is used to attach the side panel to the upper perimeter rail 16 (further described in FIG. 14). The panel stabilizing clips may, but need not, be placed opposing the panel connecting clips. The stabilizing clips are placed over the upper perimeter rail 16 of the framework. The countertop as shown in previous figures is subsequently attached on top of the modules, supported by the upper framework and laid across the stabilizing clips, keeping them securely in place. Thus, the side panels can be easily removed, changed, and added by means of the panel connection and stabilizing clips.

Figure 13:
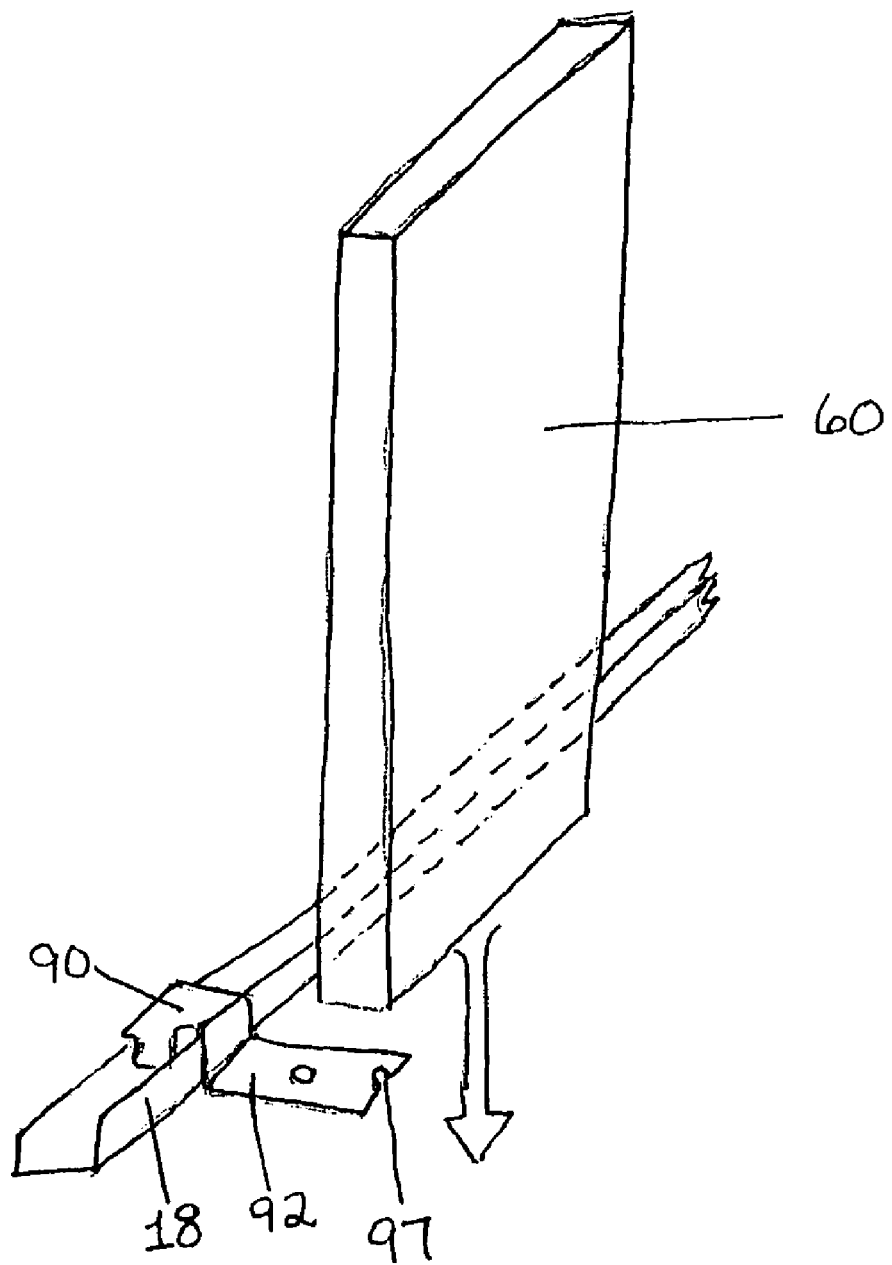
FIG. 13 is a perspective view of a side panel being placed onto a panel connecting clip, which clip is inserted into a lower perimeter rail.

FIG. 13 is a partial lower perimeter rail 18 of the framework having a panel connection clip 90 inserted into the rail 18. A side panel 60 is being placed onto the panel connection clip 90 where it will be supported to form one side of the enclosed modular counter assembly.

FIG. 14 displays four views of the metal panel stabilizing clip 120. In FIG. 14A, one can see that this stabilizing clip has three sides in a c-shape, each side having a 90-degree angle to the other. The top side 122 of the c-shape is slightly longer than the opposing side and has a short extension 121 bent in an acute angle toward the opposing side. FIG. 14B illustrates the stabilizing clip 120 in place over the top of a side panel 60 with the upper perimeter rail having been removed. In FIG. 14C, the panel stabilizing clip 120 is also shown in place over the top of a side panel 60, but in this illustration the upper perimeter rail 16 is also shown. This drawing is a perspective view from the exterior of the modular framework. Finally, FIG. 14D illustrates the panel stabilizing clip 120 in place from a perspective view from the interior of the modular framework. In this view, the stabilizing clip crosses the top of the side panel and the upper perimeter rail 16 of the framework, and the acutely angled extension hooks underneath the rail (see FIG. 12).

FIG. 15 shows part of two lower perimeter rails 18 being placed onto a 90-degree splice 140 to form a corner for the modular counter assembly. This figure also illustrates the placement of a leveling foot 160 (further described in FIG. 17).

Figure 16:
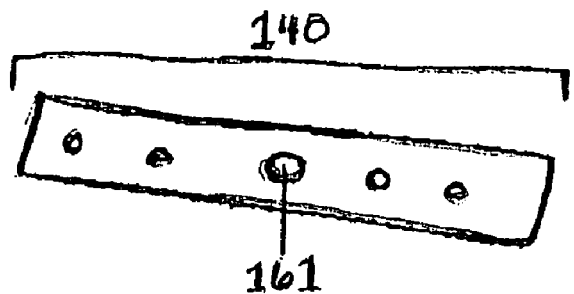
FIG. 16 are views of three embodiments of the corner splices, FIG. 16A being a 180 degree splice, FIG. 16B being a 90 degree splice, and FIG. 16C being an obtuse angle splice.
Figure 16:
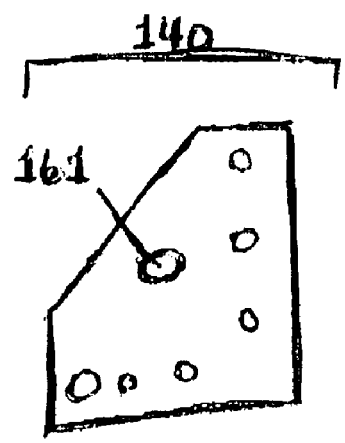
Figure 16:
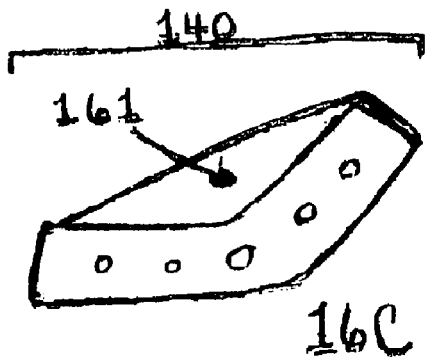

In FIG. 16, three embodiments of the metal splice 140 are shown. FIG. 16A shows a 180-degree splice, FIG. 16B illustrates a 90-degree splice, and FIG. 16C illustrates a splice having an obtuse angle. Splices are available in all degrees, ranging from 1 degree to 180 degree, allowing for the connection of modules at any angle preferred by the consumer. If desired, a leveling foot, shown in FIG. 17, may be secured through a hole 161 in any of the splices.

Figure 17:
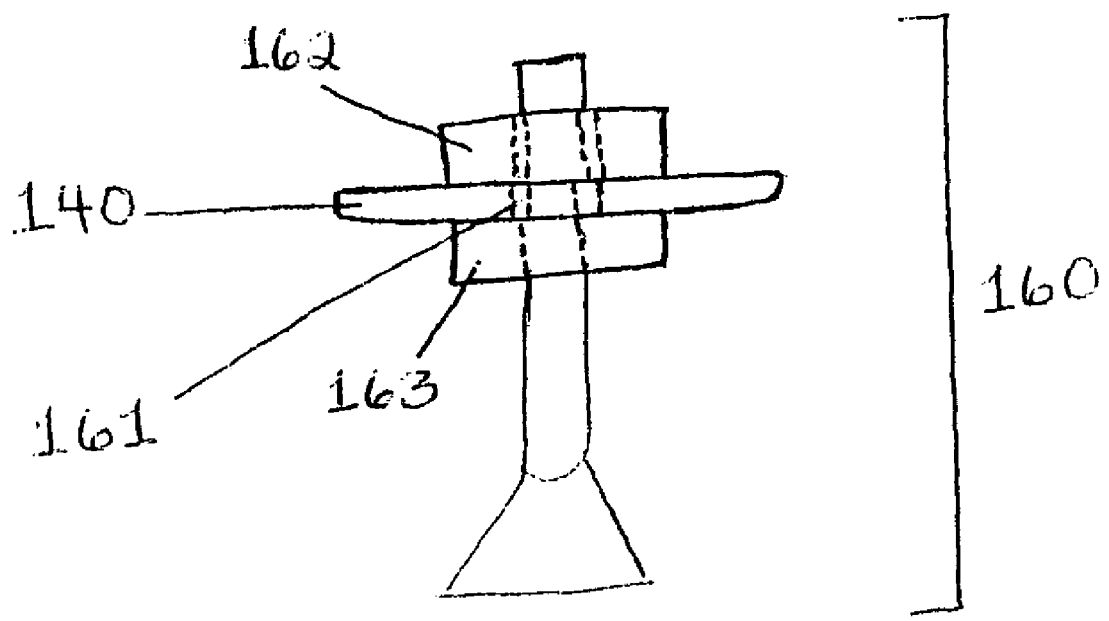
FIG. 17 is a side view of a leveling foot.

FIG. 17 illustrates a preferred embodiment of a leveling foot 160 that can be inserted into a hole 161 in a splice 140 (as shown in FIG. 15) for purposes of leveling the entire modular counter assembly. The leveling foot is attached and leveled by means of an upper and lower nut 162, 163 placed onto the leveling foot and resting on either side of the splice.

OPERATION OF THE CURRENT INVENTION

In the preferred mode operation of the present invention, the modular framework is first constructed with vertical risers, diagonals, upper and lower framework rails, and perimeter and cross-support framework rails, using splices, screws, and bolts for attaching the framework pieces together and for securing it, if desired, to the ground, floor, or other platform where it is being built. Doors, vent covers, shelving, and other custom components may be secured to the framework. Side panels are added using the panel connection clips and panel stabilizing clips. Countertops are added and secured. Finally, desired appliances and additional internal components are included to complete the modular assembly.

The entire modular assembly may be disassembled simply by reversing the process for building it. The assembly is reusable and movable, and any of the components and pieces of the framework are replaceable. It can also be reshaped or altered for different uses. For example, the side panels may be changed for different looks at the preference of the consumer.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. A modular counter assembly comprising:
   a shell for supporting and containing customized components, said shell being comprised of a metal framework having a plurality of removably attached lower perimeter rails, upper perimeter rails, vertical risers, cross-supports, diagonal supports, and side panels that are removably attached at the lower edge to the shell and framework by means of a plurality of metal connecting clips;

wherein said shell and framework comprise a plurality of modules removably attached to each other by means of angled splices; wherein said shell and framework additionally are capable of supporting countertops and side panels; and wherein the metal connecting clips are comprised of one piece in the form of a rectangular box with one face open, with open slots at each corner of the open face extending down to the opposite closed side of said box and specifically sized to be inserted onto the lower perimeter rails of said framework, and with one long face extending above the plane of the open face, then curving outward at a 90-degree angle away from said box, and terminating with a small tab portion that curves upward at a 90-degree angle toward the plane of said closed face.

2. A modular counter assembly as in claim 1, wherein the shell and framework are leveled using moveable footings.

3. A modular counter assembly as in claim 1, wherein the splices used for attaching the modules are created in a plurality of angles ranging from 1 degree to 180 degrees, such that the modules can be attached at any angle desired to create a customized shape for the entire assembly.

4. A modular counter assembly as in claim 1, additionally comprising a countertop.

5. A modular counter assembly as in claim 1, wherein the shell and framework are secured to the platform on which the assembly is built.

6. A modular counter assembly as in claim 1, wherein the metal connecting clips are pierced for purposes of securing the clips to the ground, floor, or platform on which the modular counter assembly rests.

7. A modular counter assembly as in claim 1, wherein the custom components comprise a cooking grill having movable grill racks, movable fuel baskets, forced and ambient air supply and vents operable to accelerate and maintain elevation of the temperature of said fuel to a degree suitable for cooking food, gas and electrical outlets and appliance circuitry, fresh and gray water tanks, at least one sink, waste disposal systems, an ignition housing, and charcoal storage units and drawers.

8. A modular counter assembly comprising:
a shell for supporting and containing customized components, said shell being comprised of a metal framework having a plurality of removably attached lower perimeter rails, upper perimeter rails, vertical risers, cross-supports, diagonal supports, and side panels that are removably attached at the upper edge to the shell and framework by means of a plurality of metal stabilizing clips, wherein said shell and framework comprise a plurality of modules removably attache to each other by means of angled splices; wherein said shell and framework additionally are capable of supporting countertops and side panels; and wherein the metal stablizing clips are comprised of one piece in the form of an "c" shape, having a thin horizontal strip specially sized to extend across the upper edge of the side panel and the vertical riser, with an extension on one end of the horizontal strip andgled at approximately 55 to 75 degrees to fit against inner side of the vertical riser and a further extension on the opposing end of the horizontal strip angled at 90 degrees, the end of which further extension is bent at an acute angle back toward the side panel such that it comes into contact with the side panel when in place.

9. A modular counter assembly as in claim 8, wherein the shell and framework are leveled using moveable footings.

10. A modular counter assembly as in claim 8, wherein the splices used for attaching the modules are created in a plurality of angles ranging from 1 degree to 180 degrees, such that the modules can be attached at any angle desired to create a customized shape for the entire assembly.

11. A modular counter assembly as in claim 8, additionally comprising a countertop.

12. A modular counter assembly as in claim 8, wherein the shell and framework are secured to the platform on which the assembly is built.

13. The modular counter assembly as in claim 8, wherein the custom components comprise a cooking grill having movable grill racks, movable fuel baskets, forced and ambient air supply and vents operable to accelerate and maintain elevation of the temperature of said fuel to a degree suitable for cooking food, gas and electrical outlets and appliance circuitry, fresh and gray water tanks, at least one sink, waste disposal systems, an ignition housing, and charcoal storage units and drawers.

14. A method of fabricating a modular counter assembly comprising the steps of:
providing a plurality of lower perimeter rails, upper perimeter rails, vertical risers, cross-supports, diagonal supports, side panels, angled splices, and metal connecting clips;

fabricating a plurality of modules for supporting and containing customized components; each module fabricated by removably attaching a plurality of said lower perimeter rails, upper perimeter rails, vertical risers, cross-supports, and diagonal supports; wherein said modules are capable of supporting countertops and side panels;

removably attaching a plurality of said side panels at the lower edge of each module by means of a plurality of said metal connecting clips;

fabricating a shell by removably attaching said modules to each other by means of said angled splices;

wherein said metal connecting clips are comprised of one piece in the form of a rectangular box with one face open, with open slots at each corner of the open face extending down to the opposite closed side of said box and specifically sized to be inserted onto the lower perimeter rails of said shell, and with one long face extending above the plane of the open face, then curving outward at a 90-degree angle away from said box, and terminating with a small tab portion that curves upward at a 90-degree angle toward the plane of said closed face.

15. A method as claimed in claim 14, further comprising the step of attaching moveable footings to said shell and modules for use in leveling.

16. A method as claimed in claim 14, wherein the splices used for attaching the modules are created in a plurality of angles ranging from 1 degree to 180 degrees, such that the modules can be attached at any angle desired to create a customized shape for said shell.

17. A method as claimed in claim 14, additionally comprising the step of attaching a countertop to said shell and modules.

18. A method as claimed in claim 14, wherein the shell and modules are secured to the platform on which said shell and modules are built.

19. A method as claimed in claim 14, wherein the metal connecting clips are pierced for purposes of securing the clips to the ground, floor, or platform on which the modular counter assembly rests.

20. A method as claimed in claim 14, wherein the custom components comprise a cooking grill having movable grill racks, movable fuel baskets, forced and ambient air supply and vents operable to accelerate and maintain elevation of the temperature of said fuel to a degree suitable for cooking food, gas and electrical outlets and appliance circuitry, fresh and gray water tanks, at least one sink, waste disposal systems, an ignition housing, and charcoal storage units and drawers.

21. A method of fabricating a modular counter assembly comprising the steps of:
 providing a plurality of lower perimeter rails, upper perimeter rails, vertical risers, cross-supports, diagonal supports, side panels, angled splices, and metal stabilizing clips;
 fabricating a plurality of modules for supporting and containing customized components; each module fabricated by removably attaching a plurality of said lower perimeter rails, upper perimeter rails, vertical risers, cross-supports, and diagonal supports; wherein said modules are capable of supporting countertops and side panels;
 removably attaching said plurality of side panels at the upper edge of each module by means of a plurality of metal stabilizing clips;
 fabricating a shell by removably attaching said modules to each other by means of said angled splices; and
 wherein the metal stabilizing clips are comprised of one piece in the form of an "c" shape, having a thin horizontal strip specifically sized to extend across the upper edge of the side panel and the vertical riser, with an extension on one end of the horizontal strip angled at approximately 55 to 75 degrees to fit against inner side of the vertical riser and a further extension on the opposing end of the horizontal strip angled at 90 degrees, the end of which further extension is bent at an acute angle back toward the side panel such that it comes into contact with the side panel when in place.

22. A method as claimed in claim 21, further comprising the step of attaching moveable footings to said shell and modules for use in leveling.

23. A method as claimed in claim 21, wherein the splices used for attaching the modules are created in a plurality of angles ranging from 1 degree to 180 degrees, such that the modules can be attached at any angle desired to create a customized shape for said shell.

24. A method as claimed in claim 21, additionally comprising the step of attaching a countertop to said shell and modules.

25. A method as claimed in claim 21, wherein the shell and modules are secured to the platform on which the shell and modules are built.

26. A method as claimed in claim 21, wherein the custom components comprise a cooking grill having movable grill racks, movable fuel baskets, forced and ambient air supply and vents operable to accelerate and maintain elevation of the temperature of said fuel to a degree suitable for cooking food, gas and electrical outlets and appliance circuitry, fresh and gray water tanks, at least one sink, waste disposal systems, an ignition housing, and charcoal storage units and drawers.

* * * * *